(12) United States Patent
Kinnan et al.

(10) Patent No.: US 9,834,649 B1
(45) Date of Patent: Dec. 5, 2017

(54) SHAPED FIBER COMPOSITES

(71) Applicant: Sandia Corporation, Albuquerque, NM (US)

(72) Inventors: Mark K. Kinnan, Albuquerque, NM (US); Dennis P. Roach, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 600 days.

(21) Appl. No.: 14/047,779

(22) Filed: Oct. 7, 2013

Related U.S. Application Data

(60) Provisional application No. 61/710,321, filed on Oct. 5, 2012.

(51) Int. Cl.
*C08K 5/04* (2006.01)
*C08J 5/04* (2006.01)

(52) U.S. Cl.
CPC ............... *C08J 5/043* (2013.01); *C08J 5/042* (2013.01); *C08J 5/044* (2013.01); *C08J 5/046* (2013.01)

(58) Field of Classification Search
CPC ..... C08J 5/04; C08J 5/042; C08J 5/044; C08J 5/046
USPC ........................................... 523/222
See application file for complete search history.

(56) References Cited

FOREIGN PATENT DOCUMENTS

EP    0572965 A1    8/1993

*Primary Examiner* — Edward Cain
(74) *Attorney, Agent, or Firm* — Daniel J. Jenkins

(57) ABSTRACT

A composite article is disclosed that has non-circular fibers embedded in a polymer matrix. The composite article has improved damage tolerance, toughness, bending, and impact resistance compared to composites having traditional round fibers.

10 Claims, 3 Drawing Sheets

SHAPED FIBER COMPOSITES

CROSS-REFERENCE TO RELATED APPLICATIONS

This application claims the benefit of U.S. Provisional Patent Application No. 61/710,321, entitled "Shaped Fibers for High Performance Composites," filed Oct. 5, 2012, which is incorporated herein by reference in its entirety.

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

This invention relates generally to composite materials, and more particularly to a composite material containing shaped fibers.

BACKGROUND OF THE INVENTION

Fiber-reinforced composites are high strength, high modulus materials which are finding wide acceptance for use as structural components in a variety of applications, such as aerospace, structural engineering, and automotive applications. In addition, these composites also have use in ballistic resistant materials, sporting goods, home appliances, pressure vessels and storage tanks, bridges, boat and scull hulls, sailboats, rowing shells, bicycle and motorcycle frames and components, swimming pools, spacecraft including satellites, concrete, heat shields, fuselages, disk brake systems, pipes and industrial materials, trains, electronic devices and equipment, musical instruments, audio components, furniture, medical equipment, windmills, civil engineering and construction related.

Typically, the composites used in structural applications comprise structural fibers in the form of continuous filaments or woven cloth embedded in a thermosetting or thermoplastic matrix. Such composites may exhibit considerable strength and stiffness, and the potential for obtaining significant weight savings makes them highly attractive for use in primary structural applications as a metal replacement. However, acceptance for many structural applications has been limited by the fact that many of the composite materials presently available are brittle. The inability of such composites to withstand impact while retaining useful tensile and compression strengths has been a serious problem for many years. Compensating for the brittleness and low impact resistance of such materials may ordinarily be accomplished by increasing the amount of material employed. This approach increases costs, reduces the weight savings that might otherwise be realized and may make them unacceptable for many uses.

The composites industry has long been involved in finding ways to overcome these deficiencies. Considerable effort has been expended over the past two decades directed toward the development of composites with improved fracture toughness. Inasmuch as most of the commonly employed matrix resins, as well as many of the reinforcing fibers, are generally brittle, much of that effort has gone into a search for component replacements having better toughness characteristics.

The round fibers used in composites fabricated today have a low surface area resulting in large voids and increased resin content when packed during manufacturing. This configuration makes the fiber-resin composite sheets less resistant to extreme bending—global and localized such as those experienced during impact events. In addition, these materials have limited tailorability.

Thus, there is a need for tough, impact resistant composite materials that offer increased property tailorability, increased damage tolerance, decreased delamination potential, decreased composite weight, and maximized mechanical interlocking.

SUMMARY OF THE INVENTION

The present invention overcomes these difficulties encountered with prior art fiber reinforced composite materials.

According to an embodiment of the invention, a composite article is disclosed that includes a polymer matrix having non-circular fibers embedded in the matrix;

An object of the present invention is to improve the toughness and impact resistance of a structural material. Another object of the present invention is to improve the toughness and impact resistance of a non-structural composite materials.

Another object of the present invention is to disclose a fiber reinforced composite having increased property tailorability.

Another object of the present invention is to disclose a fiber reinforced composite having increased damage tolerance.

Another object of the present invention is to disclose a fiber reinforced composite having decreased delamination potential.

Another object of the present invention is to disclose a fiber reinforced composite having decreased composite weight.

Another object of the present invention is to disclose a fiber reinforced composite having maximized mechanical interlocking.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION

The present disclosure is directed to a fiber reinforced composite material wherein the reinforcing fibers have a non-circular cross-section. The fiber reinforced composite material is a material that offers increased property tailorability, increased damage tolerance, increased impact resistance, decreased delamination potential, decreased composite weight, and maximized mechanical interlocking.

Figure 1:
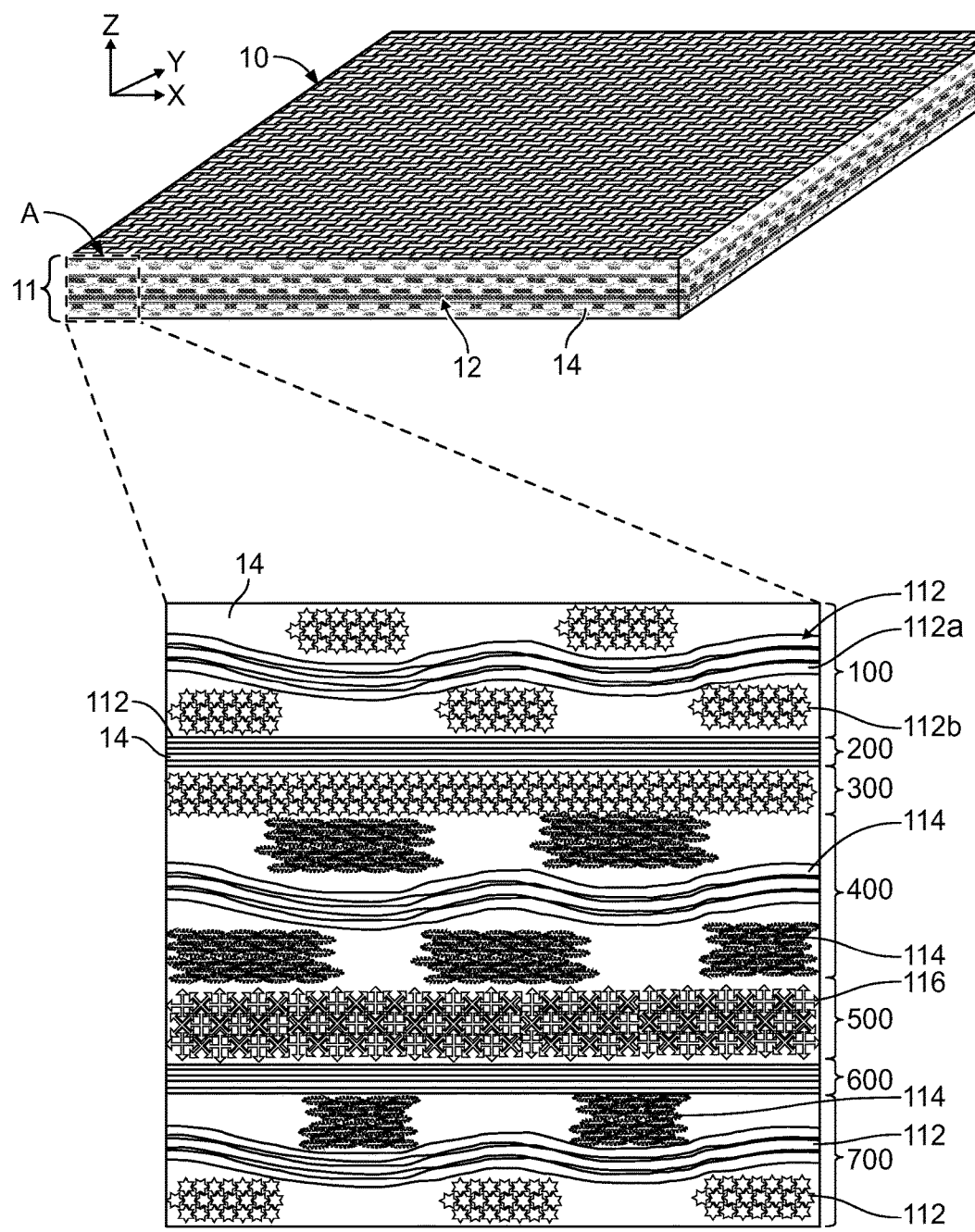
FIG. 1 is a perspective view of a fiber reinforced composite according to an embodiment of the invention.

FIG. 1 illustrates an embodiment of a composite article 10 according to the present invention. As can be seen in FIG. 1, the composite article 10 includes multiple layers 11 including non-circular fibers 12 in a matrix 14. In another embodiment, the composite article 10 may include two or more layers. The term "non-circular" in this disclosure includes, but is not limited to hemispherical, crescent, irregular, jagged, tapered, X, rectangular, square, triangular, Y or forked, H, trapezoid, bar shaped, wavy, or any other symmetrical or asymmetrical shape. The term "non-circular" also includes irregular shapes, such as the examples shown in FIG. 2. The non-circular fibers may be symmetrical or nonsymmetrical and be hollow or solid. In another embodiment, the composite article 10 may include circular cross-sectional fibers in addition to shaped fibers.

The non-circular fibers may have surfaces that provide an interlocking feature that allows for adjacent fibers to lock into a relative position in the matrix. The interlocking features reduce or prohibit crack and delamination propagation upon damage to the composite. It can also help with the prevention of damage onset as the interlocking feature produces a laminate (stack of multiple plies) with an increased ability to sustain higher interlaminar shear stresses. In an embodiment, the interlocking feature may be an anchor or cap as discussed below in regard to fibers 116 having a modified X cross section. In another embodiment, the interlocking or interdigitation feature may be an opening, channel or protrusion.

The non-circular fibers have increased fiber surface area compared to a round fiber of similar diameter which results in a larger surface area for a fiber to interact with one another and to adhere/interact to a matrix.

Portion A shows an expanded end view of a section of article 10. As can be seen in Portion A, the composite article 10 includes a first layer 100 including non-circular fibers 112 in a matrix 14. The non-circular fibers 112 have a star cross-section. In this exemplary embodiment, the star cross-section has five points. In another embodiment, the star cross-section may have 5 or more points. Additionally, in this exemplary embodiment, the non-circular fibers 112 have a uniform, symmetric cross-section. In another embodiment, the non-circular fibers 112 may have a non-uniform and/or non-symmetric cross-section.

Figure 2:
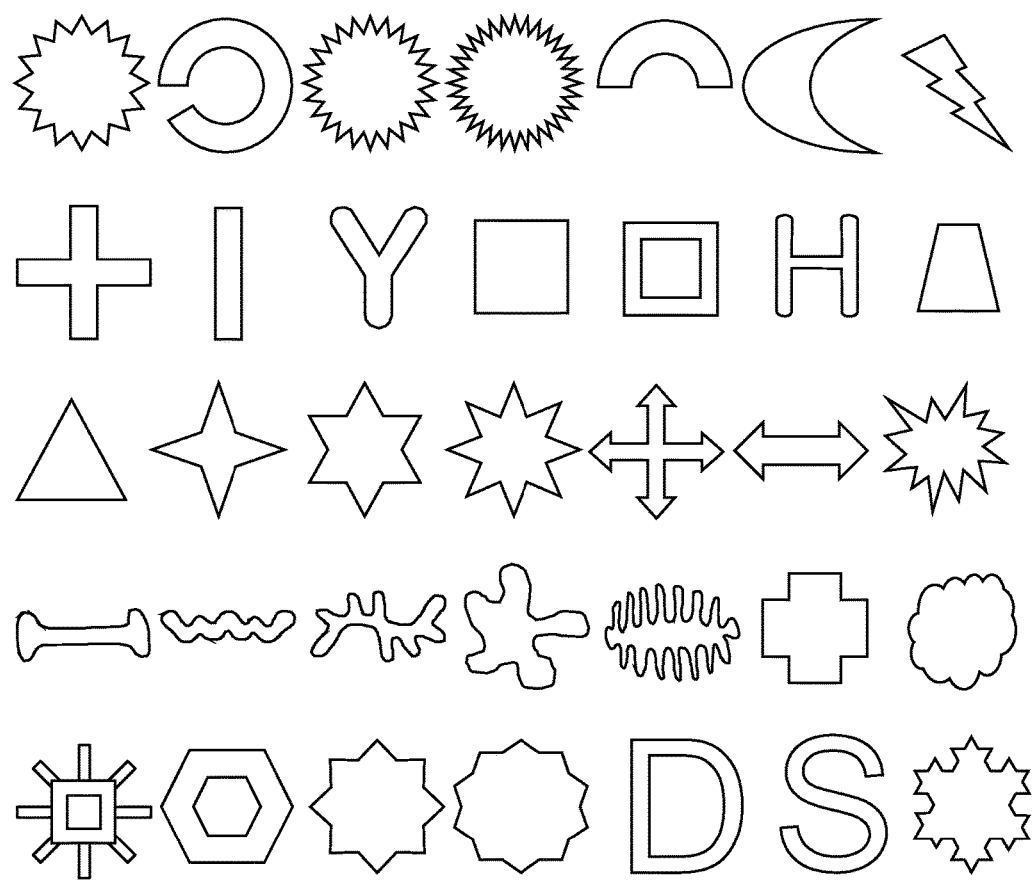
FIG. 2 illustrates examples of non-circular fiber cross sections.
Figure 3:
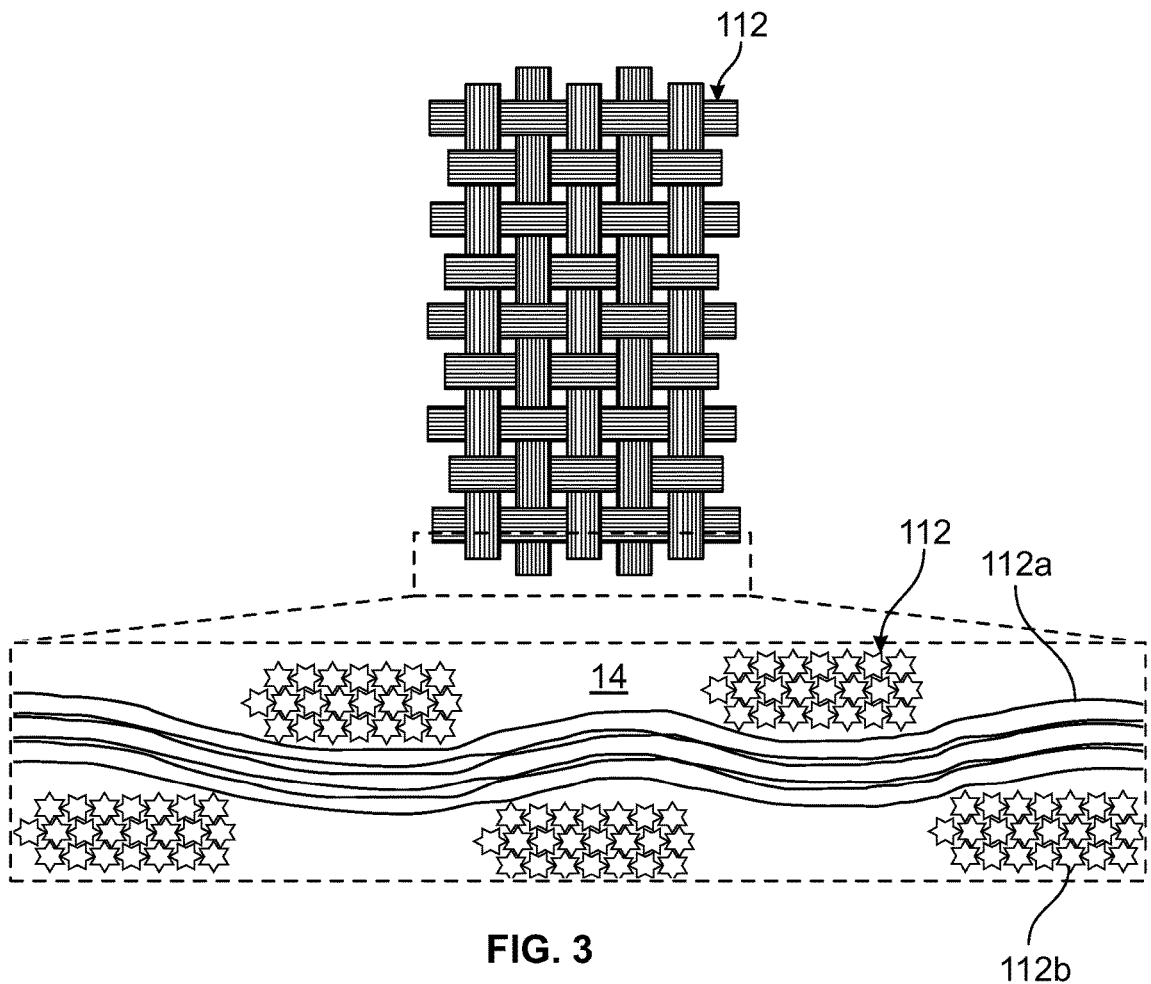
FIG. 3 is a top and cross sectional view of the first layer of FIG. 1 illustrating an interwoven weave.

The non-circular fibers 112 include a non-circular fiber first group 112a interwoven with a non-circular fiber second group 112b. In this exemplary embodiment, the first and second groups 112a, 112b have three layers of noncircular fibers 112. In another embodiment, the first and second groups 112a, 112b may have one or more layers of non-circular fibers 112. The term "interwoven" is understood in the art to mean alternating overlapping layers of fibers. The interwoven weave is illustrated in FIG. 2. In this exemplary embodiment, the first layer 100 includes one interwoven fiber layer. In another embodiment, the first layer may include one or more interwoven fiber layers.

The non-circular fiber first group 112a have length axis oriented in the x axis, and the non-circular fiber second group 112b have length axis oriented in the y axis, and are thus oriented perpendicular to one another. In another embodiment, the two groups of fibers may be oriented at any angle greater than 0 degrees and less than or equal to 90 degrees.

The non-circular fibers 112 may be formed of glass such as, but not limited to S-glass and E-glass, carbon, graphite, boron, ceramic such as, but not limited to silicon nitride and silicon carbide, polymers such as, but not limited to thermosetting and thermoplastic polymers, aramid, KEVLAR™ a para-aramid synthetic fiber, registered to the DuPont Corporation, Vectra® (a liquid crystal polymer registered to Celanese Corp.), polyethylene, an extended chain polyethylene thread or fiber, a nylon (e.g. nylon 6, nylon 11, nylon 6,10 and nylon 6,6) thread or fiber, liquid crystalline copolyester thread or fiber, or mixtures thereof, and/or other materials which exhibit desired physical, thermal, chemical and/or other properties, such as but not limited to strength against stress failure.

The non-circular fibers may have a cross-sectional maximum diameter of between about 5 micrometers up to about 300 micrometers. In another embodiment, the non-circular fibers may have a cross-sectional maximum diameter of between about 5 micrometers up to about 50 micrometers. The fibers may be monofilaments, multifilaments, yarns, twisted tow or untwisted tow or sliver produced from fibers and/or other forms of continuums.

The non-circular fibers may be formed by extrusion, and may be treated by chemical etching or non-chemical methods to further enhance the fiber surface for subsequent integration into a resin matrix. Spinning is manufacturing process for creating polymer fibers. It is a specialized form of extrusion that uses a spinneret to form multiple continuous filaments. The spinning process may be wet, dry, melt, gel, or electrospinning. Some fibers, such as boron, may be produced by exposing a carrier filament to a chemical vapor deposition which places the boron material onto a filament to form a fiber.

For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip and the like having regular or irregular cross sections. The term fiber includes a plurality of any one or combination of the above.

The matrix 14 may be an adhesive or a polymer, including but not limited to epoxy, polymer resin, polyester, vinyl ester, benzoxazine, bio-based resins, and thermoplastics. In an embodiment, the polymer may be mixed as a liquid and integrated with the fibers in a "wet layup" method or may have previously been formed into a solid film adhesive which can then be meshed with the shaped fibers to form a pre-impregnated composite tape (fiber-resin sheet).

As can be further seen in FIG. 1, the composite article 10 further includes a second layer 200. Second layer 200 includes non-circular fibers 112 in matrix 14. In second layer 200, the non-circular fibers 112 are oriented with length axis in the x axis direction. In second layer 200, the fibers 112 are not woven, but are in three parallel layers. In another embodiment, the fibers 112 may be in one or more layers.

As can be further seen in FIG. 1, the composite article 10 further includes a third layer 300. Second layer 300 includes non-circular fibers 112 in matrix 14. In third layer 300, the non-circular fibers 112 are oriented with length axis in they axis direction. In third layer 300, the fibers 112 are not woven, but are in three parallel layers. In another embodiment, the fibers 112 may be in one or more layers.

As can be further seen in FIG. 1, the composite article 10 further includes a fourth layer 400. Fourth layer 400 includes non-circular fibers 114 having a wavy cross-section. Similar to the first layer 100, the fibers 112 of the fourth layer 400 are interwoven. In this exemplary embodiment, the interwoven fibers have multiple layers of noncircular fibers 114. In another embodiment, the interwoven fibers may include one or more layers of non-circular fibers 114. In this exemplary embodiment, the fourth layer 400 is one interwoven fiber layer. In another embodiment, the fourth layer 400 may include one or more interwoven fiber layers.

As can be further seen in FIG. 1, the composite article 10 further includes a fifth layer 500. Fifth layer 500 includes non-circular fibers 116 having a modified X cross-section. The non-circular fibers 116 of the fifth layer 500 are arranged in multiple layers having the length axis of the fibers parallel in the y axis. In another embodiment, the fibers 112 may be arranged in one or more layers and/or may be interwoven.

Figure 4:
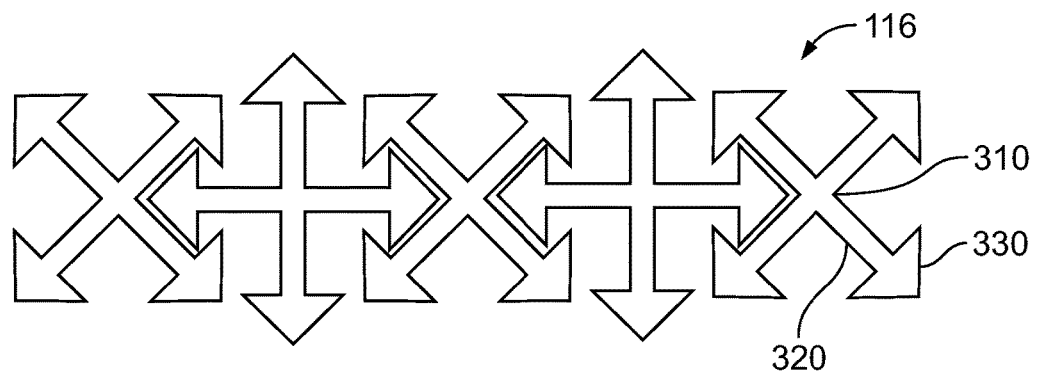
FIG. 4 is an end view of a portion of fibers with the X cross-section.

FIG. 4 illustrates an enlarged end view of a portion of fibers 116 with the modified X cross-section. As can be seen in FIG. 4, the fibers 116 have a center portion 310 running the length axis. The fibers 112 further have four protrusions 320 extending from the center portion 310 that are terminated with an end cap 330 having a profile larger than the protrusions. In such a manner, the end caps 330 function as hooks or blocks that allow for adjacent fibers to be engaged.

As can be further seen in FIG. 1, the composite article 10 further includes a sixth layer 600. Sixth layer 600 is constructed similar to the second layer 200.

As can be further seen in FIG. 1, the composite article 10 further includes a seventh layer 700. The seventh layer 700 includes a combination of fibers 112 and 114 in the y axis and fibers 112 in the x axis. In another embodiment, each fiber layer may have one or more layers of fibers. In another embodiment, the seventh layer 700 may have one or more layers of fibers having one or more types of fibers having different cross-sections which may also include circular cross-sectional fibers.

In another embodiment, the composite 10 may include one or more layers having one or more fiber layer arrangement having one or more fibers of similar or differing cross-sections. For example, a unidirectional layer of fibers could contain circular, star, and Y shaped fibers within the same layer. In an embodiment, any one or more of the layers may further include circular cross-sectional fibers.

The composites of the present invention result in stronger fiber-resin adhesion that requires less resin and fewer fibers resulting in lighter weight and stronger composites. For composites having fibers that have shapes having grooves along the length of the fiber, it is possible to pack the grooves with a different material such as nano-ceramics to increase the stopping power of projectiles upon impact with the composite. When composites of the present invention using shaped fibers are subject to damage, the fracture propagation between fibers is decreased when subjected to load, thereby increasing the structures damage tolerance.

The non-spherical shaped fibers in the composites of the present invention that have edges/grooves running along the length of a fiber prevent fiber rotation when a composite is under strain, thereby, minimizing the possibility of delamination (separation of the fiber from the resin). In an embodiment, the fiber shape is selected to offer optimal packing of the fibers that result in a higher density of fibers per unit volume. Examples of shapes include but not limited to stars or other shapes that enable interdigitation of entities on the fibers. This can include points of star shaped fiber interdigitating with the valley between points of an adjacent star shaped fiber. This reduces the amount of resin needed to fabricate the composite resulting in a lighter weight composite. In an embodiment, the fiber shape is selected to maximize mechanical inter-locking between fibers (see FIG. 2). Due to the interlocking nature of the shaped fibers, the resulting composite structure has enhanced torsional and bending resistance and improved damage resistance and fatigue properties.

The composite of the present invention can be formed by any conventional procedure. As such, they may be formed into batts, arrays or other groupings, and/or they may be woven, knitted or otherwise oriented into desired configurations and shapes for reinforcement preforms. In any event, usually particular attention is paid to ensure the optimum utilization of the properties for which the constituent reinforcing materials have been selected, such as by directionally orienting them as hereinafter described. For example, a composite article of the present invention may be made by impregnating layered fiber weaves, by assembling pre-preg composite laminate tape layers or by impregnating individual fiber layers and assembling them in a wet lay-up process. For example, one such procedure involves preforming a multilayer laminate and thereafter subjecting the laminate to a suitable layup. In one such procedure fibrous layers are aligning in a polymeric matrix and thereafter molded at a suitable temperature and pressure to form a laminate structure of the desired thickness. Another suitable procedure is where a composite is formed of a plurality of fiber layers in which the polymer forming the matrix coats or substantially coats the filaments of multifilament fibers and the coated fibers are arranged in a sheet-like array and aligned parallel to one another along a common fiber direction. Successive layers of such coated, uni-directional fibers can be rotated with respect to the previous layer to form a laminated structure 10. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. The laminates composed of the desired number of layers can be molded at a suitable temperature pressure to form a precomposite having a desired thickness. Techniques for fabricating these laminated structures are described in greater detail in U.S. Pat. Nos. 4,916,000; 4,623,574; 4,748,064; 4,457,985 and 4,403,012.

In an embodiment, a composite article may be formed by molding. The molding process begins by placing a fiber preform on or in the mold. The fiber preform can be dry fiber, or fiber that already contains a measured amount of resin called "pre-preg". Dry fibers are "wetted" with resin either by hand or the resin is injected into a closed mold. The part is then cured, leaving the matrix and fibers in the shape created by the mold. Heat and/or pressure are sometimes used to cure the resin and improve the quality of the final part.

In an embodiment, a composite article may be formed by applying a composite tape to a component or member and curing the tape to form a composite patch, component or member. For example, a composite tape may be applied to a pipe defect and cured to form a seal. The tape may be cured by any conventional technique.

In an embodiment, a composite article may be formed by applying the shaped fiber around another material (e.g. aluminum) that provides the core shape of the structure being manufactured. This filament winding method applies the fibers dry and then follows with a resin impregnation process or can be done by dipping the fibers in a resin during the application.

The composite of the present invention may be formed into structural components for aircraft, building, military and automotive applications. In addition, these composites also have use in ballistic resistant materials, sporting goods, home appliances pressure vessels and storage tanks, bridges, boat and scull hulls, sailboats, rowing shells, bicycle and motorcycle frames and components, swimming pools, spacecraft including satellites, concrete, heat shields, fuselages, disk brake systems, pipes and industrial materials, trains, electronic devices and equipment, musical instruments, audio components, furniture, medical equipment, windmills, civil engineering and construction related Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An composite article, comprising:
   a polymer matrix; and
   fibers embedded in the matrix;
   wherein the fibers comprise an interlocking feature that interlock adjoining fibers to one another;
   wherein the interlocking feature comprises irregular protrusions.

2. The article of claim 1, wherein the fibers are asymmetrical.

3. The article of claim 1, wherein the fibers are symmetrical.

4. The article of claim 1, wherein the fibers are interwoven.

5. A composite article, comprising:
   a polymer matrix; and
   fibers embedded in the matrix;
   wherein the fibers comprise an interlocking feature that interlock adjoining fibers to one another;
   wherein the interlocking feature is selected from a group consisting of a protrusion terminated with an end cap, an anchor, a channel and an opening.

6. A structural component, comprising:
   a polymer matrix; and
   fibers embedded in the matrix;
   wherein the fibers comprise an interlocking feature that interlock adjoining fibers to one another;
   wherein the interlocking feature comprises irregular protrusions.

7. The component of claim 6, wherein the fibers are asymmetrical.

8. The component of claim 6, wherein the fibers are symmetrical.

9. The component of claim 6, wherein the fibers are interwoven.

10. A structural component, comprising:
    a polymer matrix; and
    fibers embedded in the matrix;
    wherein the fibers comprise an interlocking feature that interlock adjoining fibers to one another;
    wherein the interlocking feature is selected from the group consisting of a protrusion terminated with an end cap, a channel and an opening.

* * * * *